United States Patent [19]

Berty

[11] Patent Number: 5,021,383

[45] Date of Patent: Jun. 4, 1991

[54] CATALYST FOR THE DESTRUCTION OF TOXIC ORGANIC CHEMICALS

[75] Inventor: Jozsef M. Berty, Akron, Ohio

[73] Assignee: Berty Reaction Engineers, Ltd., Fogelsville, Pa.

[21] Appl. No.: 367,003

[22] Filed: Jun. 16, 1989

[51] Int. Cl.$^5$ ............................................ B01J 27/232
[52] U.S. Cl. .................................................... 502/174
[58] Field of Search ................................. 502/174, 324

[56] References Cited

U.S. PATENT DOCUMENTS

| | | | |
|---|---|---|---|
| 2,587,599 | 3/1952 | Corson et al. | 502/174 |
| 3,198,748 | 8/1965 | Keith et al. | 502/174 X |
| 3,361,683 | 1/1968 | Gutmann | 502/174 |
| 4,467,046 | 8/1984 | Smith et al. | 502/174 |
| 4,562,174 | 12/1985 | Stiles | 502/174 |
| 4,656,154 | 4/1987 | Drake | 502/185 |
| 4,832,926 | 5/1989 | Schillaci | 502/324 X |

FOREIGN PATENT DOCUMENTS 531358 1/1941 United Kingdom ................ 502/174

*Primary Examiner*—W. J. Shine

[57] ABSTRACT

A catalyst for the destructive oxidation of toxic organic chemicals comprises a metal or metal oxide impregnated on, or dispersed in alkaline earth metal carbonate. A method is also provided for destructive oxidation of toxic organic chemicals using such catalyst.

12 Claims, No Drawings

CATALYST FOR THE DESTRUCTION OF TOXIC ORGANIC CHEMICALS

FIELD OF THE INVENTION

This invention generally relates to the destruction of toxic organic chemicals, and is particularly related to the catalytic oxidation of toxic hydrocarbons and hydrocarbon derivatives to thereby convert the toxic materials into non-toxic products such as gaseous carbon dioxide. More specifically, the present invention is related to the oxidation of toxic chlorinated hydrocarbons to passive gaseous by-products using a unique catalyst system comprising a metal or a metal oxide in combination with an alkali or an alkali-earth carbonate, or an alkali-earth oxide and hydroxide. The invention also relates to the novel catalyst used in this method.

BACKGROUND OF THE INVENTION

Halogenated hydrocarbons such as, e.g., chlorocarbons, are a major source of environmental pollution and toxic waste. These hydrocarbons are the products or by-products of several industrial processes and present serious health hazards. Accordingly, they must either be destroyed or converted to passive, non-toxic products.

One method of destruction of such toxic materials involves their thermal destruction, which requires a temperature above 1000° C. However, even at such high temperatures some toxic materials such as polychlorinated biphenyls (PCBs) survive or they are converted to the more toxic polychlorinated dibenzo-p-dioxins (PCDD). Moreover, toxic nitrous oxides ($N_2O$) are also formed at these temperatures.

Other methods of destruction of halogenated hydrocarbons have been disclosed in the prior art. For example, multi-stage catalytic destruction of PCBs is disclosed by Lombardi et al, "Incineration of PCBs Using Fluidized Bed Incinerator," Rockwell International: Golden, CO, 1981. However, this method involves multi-stage operation for high conversion, is complicated, costly and inefficient.

Others have used catalysts on monolithic supports to oxidize the halogenated hydrocarbons. See P. Subbanna et al, Environmental Science Technology, 1988, Vol. 22, pp. 557–561. Although this method has the advantage of a low pressure drop operation, it results in low conversion of the toxic hydrocarbons and the generation of many secondary toxic products. Moreover, in order to improve the conversion of the toxic hydrocarbons, this catalytic process, as in the aforementioned Lombardi et al article, requires multi-stage operation and a temperature of 600° C. or higher at which both nitrous oxide and highly refractory toxic materials are formed.

Other methods of destruction of toxic wastes involve chemical treatment with sodium or calcium. See Chemical Engineering, 1981, Vol. 88(16), pp.37–41. However, these methods involve the use of dangerous chemicals, are highly exothermic and have not been practical industrially.

Photochemical, biological and hydrogenation methods of conversion of halogenated hydrocarbons have also been resorted to, but they require complex technology and dangerous operations. Besides, they are economically prohibitive.

See, also, Michael P. Manning, "Fluid Bed Catalytic Oxidation: An Underdeveloped Hazardous Waste Disposal Technology," Hazardous Waste, Vol. 1, No. 1, 1984, pp.41–65; James K. Musick et al, "Hopcalite Catalyst for Catalytic Oxidation of Gases and Aerosols," Ind. Eng. Chem., Prod. Res. Dev., Vol.14, No.4, 1975, pp.284–286, and K. P. Becker et al, "Incinerate Refinery Waste in a Fluid Bed," Hydrocarbon Processing, October 1975, pp. 88–93.

Several prior art patents also disclose the destruction of hazardous wastes. Most of these patents are directed to halogenated hydrocarbons, principally chlorinated hydrocarbons, since they cause the most difficulties in the destruction process. Exemplary patents include U.S. Pat. Nos. 3,845,191; 4,039,623, and 4,447,667.

U.S. Pat. No. 3,845,191 discloses a process for the purification of waste streams containing halocarbons which comprises oxidation of the halocarbons at a temperature of 750° C. to 1100° C. with a metal oxide catalyst selected from the group consisting of an oxide of calcium, aluminum, barium, magnesium, iron or nickel.

U.S. Pat. No. 4,039,623 describes a method of treating $C_2$ to $C_4$ halogenated hydrocarbons such as chlorinated hydrocarbons and brominated hydrocarbons whereby the halogenated hydrocarbons in a gas stream are oxidized with an oxygen-containing gas in the presence of hydrated nickel oxide catalyst at a temperature of 20° C. to 500° C. This process reduces the halogenated hydrocarbon content of the gas stream.

U.S. Pat. No. 4,447,667 discloses a process for the destruction of halogenated organic compounds by reaction with an alkali metal aromatic anion reagent such as sodium naphthalide.

So far as it is known, there is presently no simple, efficient and economical method for the destruction of such toxic halocarbons and their conversion into non-toxic products. Needless to say, there is now a dire need for such method in order to reduce the amount of toxic waste materials associated with halogenated hydrocarbons.

Accordingly, it is an object of this invention to provide a method for the destruction of toxic organic chemicals.

It is a further object of this invention to convert toxic halocarbons or toxic halocarbons-containing waste materials into non-toxic products.

It is another object of this invention to provide an efficient catalytic method of converting toxic halocarbons such as, e.g., chlorocarbons, to non-toxic by-products.

It is still another object of this invention to provide a catalytic method of destruction of chlorocarbons by contacting the chlorocarbon with an oxygen-containing gas in the presence of a unique catalyst system which comprises a metal or metal oxide in the presence of alkali or alkali-earth carbonate, or alkali earth oxide and hydroxide.

The foregoing and other objects and features of this invention will be more readily understood from its following detailed description.

SUMMARY OF THE INVENTION

In accordance with this invention, toxic halocarbons are destructively oxidized in the presence of a unique catalyst system comprising a catalytically active substance in combination with an alkali metal carbonate, alkali-earth metal carbonate, alkali metal bicarbonate, alkali-earth metal carbonate, or mixtures thereof. The catalytically active substance is a metal such as manganese, copper, silver, iron and aluminum, or a metal oxide such as nickel oxide, cobalt oxide, aluminum oxide, vanadium oxide, tungsten oxide and molybdenum oxide, or mixtures thereof, used in catalytically effective amount. The carbonate may be used in discrete particulate form with the catalytic agent being impregnated thereon. Alternatively, the catalytic agent may be dispersed in the carbonate or in molten carbonate. As a result of the use of the catalyst system of this invention the toxic chlorocarbons will be converted to carbon dioxide, water and hydrogen chloride. The latter reacts with the carbonate to form the chloride salt of the alkali metal or alkali-earth metal part of the carbonate or bicarbonate.

DETAILED DESCRIPTION OF THE INVENTION

It has now been unexpectedly discovered that toxic materials such as halocarbons, particularly chlorocarbons, can be catalytically oxidized using a catalytically active material in combination with alkali or alkali-earth carbonates to thereby convert the toxic chlorocarbons to non-toxic products. The catalytically active materials include manganese, copper, silver, iron, aluminum, or metal oxides such as nickel oxide, cobalt oxide, aluminum oxide, vanadium oxide, tungsten oxide and molybdenum oxide, or mixtures thereof. Surprisingly, it has been found that the toxic materials can be destroyed by converting them to non-toxic substances when the catalyst is used together with alkali or alkali-earth metal carbonates, preferably by dispersing the catalyst in the carbonate. The carbonate may be in solid particulate form such as solid particles of carbonate minerals, e.g., limestone, dolomite, magnesite and other carbonates, or they can be synthetically manufactured carbonates. The catalytic material is preferably dispersed in the carbonate and hence the carbonate acts as a dispersing agent or a carrier for the catalyst. These catalysts may also be dispersed in molten alkali carbonates such as sodium carbonate, potassium carbonate, sodium bicarbonate and potassium bicarbonate and their hydrates, or mixtures thereof. The carbonates not only act as a dispersing media or a carrier but also react with hydrogen chloride, a by-product of the oxidative destruction of chlorocarbons described herein, to form the chloride salt of the alkali or alkali-earth metal part of the carbonate.

As it was previously stated, chlorinated hydrocarbons present the most difficulties in the destructive oxidation process. The reason is that their oxidation generates hydrogen chloride which attacks the catalyst hence retarding or even destroying its catalytic activity. In the meantime the hydrogen chloride itself becomes oxidized to chlorine which attacks the unconverted chlorinated hydrocarbon and produces more highly chlorinated hydrocarbons which are usually more resistant to further oxidation than the starting chlorocarbon. By using at least one of the aforementioned carbonates in combination with the catalyst, the carbonate reacts with the hydrogen chloride to form the more stable alkali or alkali-earth metal chloride before the hydrogen chloride is oxidized to chlorine. Additionally, the chlorine content of the catalytic material is kept low, thereby maintaining a high level of catalytic activity of the catalyst system. Increased catalytic activity permits the destructive oxidation of the chlorocarbons to be carried out at lower temperatures thus avoiding the production of undesirable nitrous oxide. Moreover, the use of the catalyst system of this invention permits low temperature operation, thus making it possible to use simple and inexpensive equipment hence making the process commercially feasible.

The invention will now be described by the following series of experiments which serve to illustrate the catalytic destruction method set forth herein without, however, limiting its scope. In the examples, trichlorothylene was used as the starting chlorinated hydrocarbon and air was employed as the oxygen-containing gas. Hopcalite (copper-manganese catalyst), a commercial catalyst developed and made available during World War I by Johns Hopkins University, Baltimore, Md., and California Institute of Technology, Berkeley, Calif., is the catalyst used in combination with limestone ($CaCO_3$).

In all experiments, the reactor was a glass tube having an inside diameter of approximately 0.7 cm. and was surrounded along its length with heating elements in order to control the reaction temperature. The reactor was insulated exteriorly and was provided with a thermocouple which was inserted into the glass tube. Approximately 6 cubic centimeters of catalyst and 10 cubic centimeters of crushed limestone were charged into the glass tube and were separated by glass chips. The catalyst was supported by a bed of glass wool and the reactor exit was stuffed with glass wool disposed on top of the limestone. Both the catalyst particles and the crushed limestone were about 0.2–0.3 cm. in size. Air was passed through the reactor and over the catalyst and limestone at the gaseous space hourly velocity of 5000 standard cubic feet which corresponds to approximately 80 liters per hour.

Before introducing the feed to the reactor the feed was split, approximately 1/10th of the feed was fed through a bubbler containing trichlorothylene maintained at a constant temperature where it became saturated to about 23,300 parts per million with the chlorinated solvent. The larger part of the feed (about 9/10th of the total feed) was passed through another bubbler containing water and picked up moisture at room temperature corresponding to about 2-3 volume percent water in air. The two streams were then combined before feeding to the reactor.

In the apparatus used in the experiments, the reactor effluent was introduced into a backflow safety test tube in order to prevent cool fluid from flowing back into, and damaging the reactor. The effluent from this tube was introduced into a flask containing phenolphthalein used to detect the presence of hydrogen chloride with a pH color test of the solution in the flask. Finally, the effluent from this flask was introduced into a second flask (Erlenmeyer flask) containing water saturated with barium hydroxide in order to detect the presence of carbon dioxide by the formation of barium chloride precipitate.

Three runs were made under the foregoing conditions except that the reaction temperature was varied in each run as follows:

| Run No. | Reactor Bottom Temp. °C. | Reactor Top Temp. °C. |
|---|---|---|
| 1 | 22 | 22 |
| 2 | 117 | 158 |
| 3 | 247 | 382 |

In Run No. 1, both air and carbon tetrachloride ($CCl_4$) were detected in the reactor effluent by gas chromatographic analysis. Air and CCl$_4$ were also detected in Run No. 2, but only air was detected in Run. No. 3. There was no CCl$_4$ in the reactor effluent.

From the results of the foregoing experiments it is concluded that hydrogen chloride was destroyed at all temperatures and CO$_2$ was formed at all temperatures. However, where the reaction temperature was below 200° C. undesired CCl$_4$ was formed and temperatures above 250° C. were necessary to prevent the production of CCl$_4$. The reason for the formation of CCl$_4$ at such intermediate temperatures is the oxidation of hydrogen chloride before it is removed in the limestone layer.

In the next series of runs, the limestone was impregnated first by a solution of potassium permanganate, followed by copper chloride solution. The Mn-Cu metalized limestone was used as the catalyst and reactant. The experiments were otherwise conducted in the same apparatus as hereinfore described under the same conditions. It was noted from these experiments that even at temperatures as low as 50° C. the catalyst was effective in converting the trichlorothylene to carbon dioxide and no CCl$_4$ was detected in the reactor effluent even below 200° C. compared to the previous experiments which required temperatures above 250° C. to prevent the production of CCl$_4$. As in the previous experiments, HCl was destroyed at all temperature levels and CO$_2$ was formed at all temperatures. This is due to the fact that on the impregnated catalyst, the HCl formed is immediately removed by the carbonate and it can never get in the vapor phase to reoxidize to chlorine and chlorinate another organic moiety.

As it can be seen from the foregoing experiments, impregnated catalyst constitutes the preferred catalyst for the practice of this invention. Although a mixture of the catalyst particles and limestone particles is effective, there is limited area of contact between the different particles. Therefore, a smaller part of the catalyst is regenerated thus resulting in slowdown of the process.

As it was previously mentioned, the catalytically active material is not limited to manganese and copper but includes other metallic catalysts such as, for example, iron oxide. Also, as previously mentioned, other carbonates and bicarbonates may replace calcium carbonates.

In other experiments using the apparatus and conditions described in connection with Runs 1-3 but using magnesium hydroxide as the catalyst without calcium carbonate, the catalytic activity was considerably lower than the catalyst of this invention due to little conversion of the feed. Similarly, the use of iron oxide or gamma-alumina (aluminum oxide) alone as the catalyst resulted in poor and insignificant conversion to non-toxic products.

Although the method of this invention has been described with a certain degree of specificity, it can be appreciated that several modifications can be made therein which are obvious from, and are within the scope of the present invention. For example, the temperature and other reaction conditions may be varied depending on the starting toxic hydrocarbon and the particular catalyst system. Other conditions such as gaseous flow rate of the oxygen-containing gas may also be varied, and the reaction may be carried out continuously, semi-continuously or in batchwise fashion if desired, although continuous operation is preferred in fixed or fluidized bed because of its higher efficiency. Other changes and variations can be made by those skilled in the art which are suggested from the present disclosure.

What is claimed is:

1. An improved catalyst for the destructive oxidation of hydrocarbon and halocarbon toxic materials and their conversion into non-toxic by-products, said catalyst consisting essentially of a metal selected from the group consisting of manganese, copper, silver, iron, aluminum, or a metal oxide selected from the group consisting of nickel oxide, cobalt oxide, aluminum oxide, vanadium oxide, tungsten oxide, molybdenum oxide, or mixtures thereof, impregnated on or dispersed in an alkali metal carbonate, alkali metal bicarbonate, alkaline earth metal carbonate, alkaline earth metal bicarbonate, or mixtures thereof.

2. A catalyst as in claim 1 wherein said alkali metal carbonate, alkali metal bicarbonate, alkaline earth metal carbonate, alkaline earth metal bicarbonate, or mixtures thereof, is impregnated with said catalyst.

3. A catalyst as in claim 1 wherein said catalyst is dispersed in said alkali metal carbonate, alkali metal bicarbonate, alkaline earth metal carbonate, alkaline earth metal bicarbonate, or mixtures thereof.

4. A catalyst as in claim 1 wherein said alkaline earth metal carbonate is calcium carbonate.

5. A catalyst as in claim 2 wherein said alkaline earth metal carbonate is calcium carbonate.

6. A catalyst as in claim 3 wherein said alkaline earth metal carbonate is calcium carbonate.

7. A catalyst as in claim 1 wherein said metal is a mixture of manganese and copper.

8. A catalyst as in claim 2 wherein said metal is a mixture of manganese and copper.

9. A catalyst as in claim 3 wherein said metal is a mixture of manganese and copper.

10. A catalyst as in claim 4 wherein said metal is a mixture of manganese and copper.

11. A catalyst as in claim 5 wherein said metal is a mixture of manganese and copper.

12. A catalyst as in claim 6 wherein said metal is a mixture of manganese and copper.

* * * * *